(12) United States Patent
Bhatt et al.

(10) Patent No.: US 9,164,687 B1
(45) Date of Patent: Oct. 20, 2015

(54) DEDUPLICATING MESSAGES FOR IMPROVING MESSAGE SAMPLING QUALITY

(75) Inventors: Neel Atulkumar Bhatt, Maharashtra (IN); Sunil Sharad Panse, Maharashtra (IN); Chirag Gupta, Uttar Pradesh (IN); Siddharth Ranoj Barman, Maharashtra (IN); Shankar Nabhaji Hundekar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 406 days.

(21) Appl. No.: 13/006,909

(22) Filed: Jan. 14, 2011

(51) Int. Cl.
  G06F 15/16 (2006.01)
  G06F 17/00 (2006.01)
  G06F 3/06 (2006.01)

(52) U.S. Cl.
  CPC .......... G06F 3/0641 (2013.01); *G06F 2219/00* (2013.01)

(58) Field of Classification Search
  USPC ........................................................ 709/206
  See application file for complete search history.

(56) References Cited

U.S. PATENT DOCUMENTS

| | | | | |
|---|---|---|---|---|
| 6,636,585 B2 * | 10/2003 | Salzberg et al. | ................. | 379/22 |
| 7,117,533 B1 * | 10/2006 | Libenzi | ............. | 726/24 |
| 7,577,656 B2 * | 8/2009 | Kawai et al. | .......................... | 1/1 |
| 7,730,113 B1 * | 6/2010 | Payette et al. | ................. | 707/821 |
| 7,734,593 B2 * | 6/2010 | Prahlad et al. | ................. | 707/640 |
| 7,870,203 B2 * | 1/2011 | Judge et al. | .................... | 709/206 |
| 8,010,511 B2 * | 8/2011 | Brock et al. | .................. | 707/694 |
| 8,156,092 B2 * | 4/2012 | Hewett et al. | ................. | 707/698 |
| 8,171,393 B2 * | 5/2012 | Rangan et al. | ................. | 715/230 |
| 8,200,641 B2 * | 6/2012 | Jayaraman | .................... | 707/692 |
| 8,266,115 B1 * | 9/2012 | Park et al. | ..................... | 707/692 |
| 2004/0039933 A1 * | 2/2004 | Martin et al. | ................. | 713/200 |
| 2005/0066190 A1 * | 3/2005 | Martin | ......................... | 713/200 |
| 2006/0004719 A1 * | 1/2006 | Lawrence et al. | ................. | 707/3 |
| 2008/0046260 A1 * | 2/2008 | Ghielmetti et al. | ............... | 705/1 |
| 2008/0301207 A1 * | 12/2008 | Demarest et al. | ............. | 707/206 |
| 2010/0011077 A1 * | 1/2010 | Shkolnikov et al. | .......... | 709/206 |
| 2011/0093471 A1 * | 4/2011 | Brockway et al. | ............ | 707/747 |
| 2011/0178996 A1 * | 7/2011 | Pendlebury et al. | .......... | 707/692 |

OTHER PUBLICATIONS

Barracude Networks (Jul. 17, 2010). Message Archiver FAQs. 4 pp. Retrieved from http://web.archive.org/web/20100715002853/http://www.barracudanetworks.ca/faqs/message-archiver.aspx.*
Giblin, Christopher, et al., (Oct. 16, 2006). From Regulatory Policies to Event Monitoring Rules: Towards Model-Driven Compliance Automation. IBM Research. 21 pp.*
Rangan, Venkat, et al. (2010). Clearwell systems at TREC 2009 legal interactive. In the eighteenth text retrieval conference (TREC 2009) proceedings.*

(Continued)

*Primary Examiner* — Kristie Shingles
*Assistant Examiner* — Timothy Sowa
(74) *Attorney, Agent, or Firm* — Campbell Stephenson LLP (57) ABSTRACT

A system and method for deduplicating messages is provided. Duplicate copies of messages are excluded from a set of deduplicated messages. The set of deduplicated messages can then be sampled to obtain a sample set usable for ensuring compliance according to a set of rules. One method for deduplicating messages involves receiving a message, determining whether the message is a duplicate copy, and adding the message to the set of deduplicated messages, if it is determined that the message is not a duplicate copy.

21 Claims, 6 Drawing Sheets

(56) References Cited

OTHER PUBLICATIONS

FINRA. (Dec. 2007). Regulatory Notice 07-59: Supervision of Electronic Communications. Retrieved from http://www.finra.org/web/groups/industry/@ip/@reg/@notice/documents/notices/p037553.pdf.*

Torys LLP, "FNRA Offers New Guidance on Review and Supervision of Electronic Communications," http://www.torys.com/Publications/Documents/Publication%20PDFs/CM2007-17.pdf, No. 2007-17, Dec. 14, 2007, pp. 2.

1.2. NYSE—Attachment A—Proposed Joint Guidance, "Review and Supervision of Electronic Communications," http://www.nyse.com/pdfs/ECommunications.pdf, 2007, pp. 12.

"EDD Blog Online: Deduplication: Custodian vs. Case," http://eddblogonline.blogspot.com/2009/08/deduplication-custodian-vs-case.html, Aug. 26, 2009, pp. 1.

Russ Fellows, Data Deduplication: When, why, where and how?, 1NFOSTOR http://www.infostor.com/index/articles/display/9365532692/articles/infostor/volume-13/Issue_11/feature/data-deduplication.html, Posted Nov. 1, 2009, pp. 4.

Symantec Corporation, Deduplication of items found in Symantec Enterprise Vault (EV) Compliance Accelerator (CA) or Discovery Accelerator (DA) review sets for export/Production, Article ID: TECH73332; Created Jan. 10, 2009; Updated Jan. 24, 2009, http://seer.entsupport.sumantec.com/docs/329587.htm, pp. 2.

\* cited by examiner

DEDUPLICATING MESSAGES FOR IMPROVING MESSAGE SAMPLING QUALITY

BACKGROUND OF THE INVENTION

1. Field of the Invention

This invention relates to compliance monitoring, and more particularly, to removing duplicate messages from a set of messages to be reviewed by a compliance monitoring product.

2. Description of the Related Art

Organizations typically implement review procedures for reviewing electronic messages sent to and from employees of the organization. Such review procedures are performed in order to comply with regulations mandated by the federal government, particularly in the financial arena.

Sometimes, the set of electronic messages to be reviewed by an organization may include duplicate copies of a single message. For example, a set of emails to be reviewed by an organization may include duplicate copies of the same email, such as when a single email has multiple recipients. Having duplicate copies of an electronic message introduces several difficulties for an organization. These difficulties may include duplicate efforts in the review of electronic messages and an organization's failure to comply with federal regulations.

It is thus desirable to remove duplicate copies of electronic messages from a set of electronic messages to be reviewed by an organization.

SUMMARY OF THE INVENTION

Various systems and methods for deduplicating messages are disclosed. For example, one method involves receiving a message. Once a message is received, a determination is made to determine whether the message is a duplicate copy. In the event that the message is not a duplicate copy, the message is added to a set of deduplicated messages. The set of deduplicated messages is one that excludes duplicate copies of messages. The set of deduplicated messages is then sampled by a compliance product to obtain a sample set, where the sample set represents a percentage of messages taken from the set of deduplicated messages.

In one embodiment, the message is received from archival storage.

The method may also involve adding a hash value for the message to a list, if the message is not a duplicate copy. This list includes hash values for messages previously included in the set of deduplicated messages.

In one embodiment, determining whether a message is a duplicate copy begins by calculating a hash value for the message based on the contents and metadata of the message. Subsequent to calculating the hash value, the hash value is then compared against other hash values included in a hash list. If a match is found within the hash list, a determination is made that the message is a duplicate copy. However, if no match is found within the hash list, a determination is made that the message is not a duplicate copy.

In another embodiment, the method involves collecting the sample set and flagging messages from the sample set as non-compliant, if the message does not comply with a set of rules.

In yet another embodiment, the message received originates from a first mail server. In addition, a second message originating from a second mail server is also received. The second message is also added to the set of messages to be reviewed.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
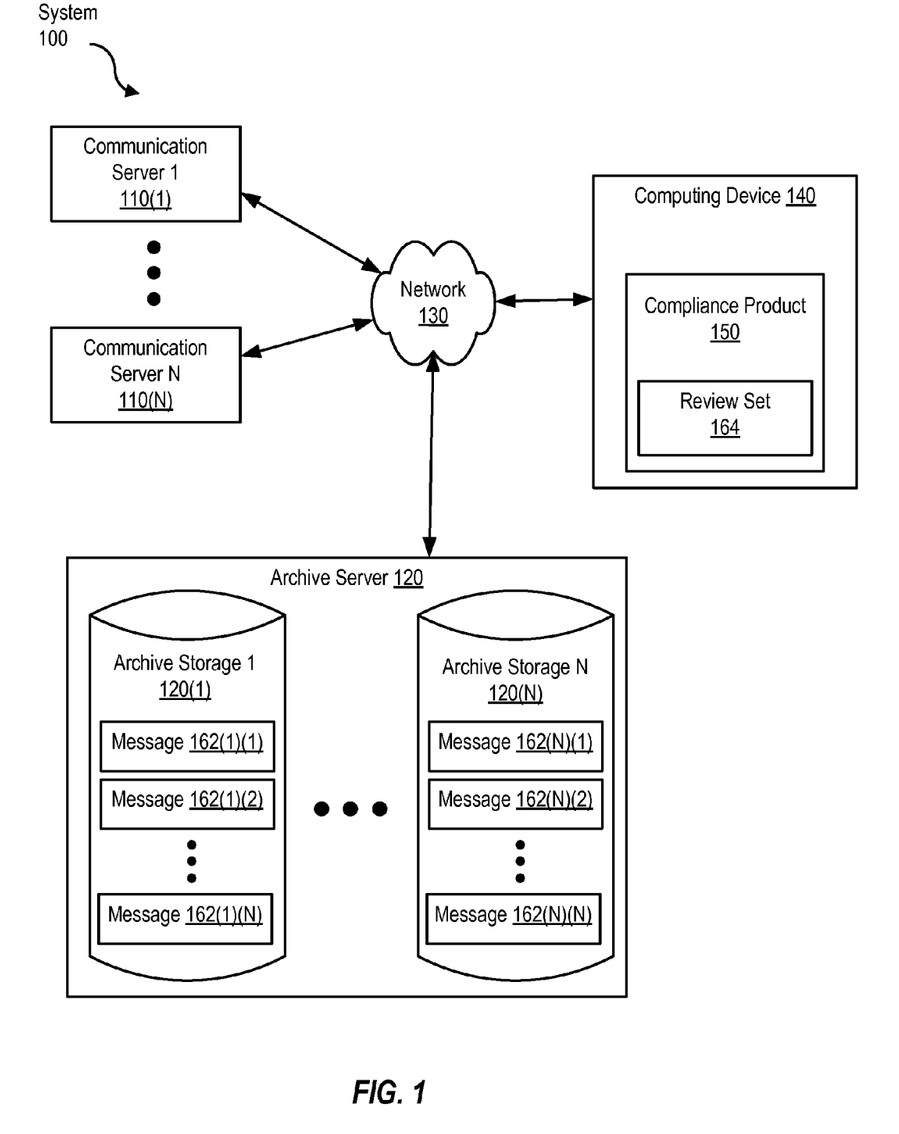
FIG. 1 is a block diagram showing a system for removing duplicate electronic messages, according to one embodiment of the present invention.

FIG. 1 is a block diagram showing relevant components of a system for removing duplicate electronic messages from a set of messages, a process known as deduplication. As shown, system 100 includes N number of communication servers 110, shown as communication servers 110(1)-(N), an archive server 120 consisting of N number of individual archive storage components, shown as archive storage components 120(1)-(N), network 130, and computing device 140 which includes compliance product 150. Although not shown, the system of FIG. 1 may also include additional communication servers, archive storage components, and computing devices.

Communication servers 110(1)-(N) may be one or more of a mail server, a file server, or a content management server. These types of servers act as data sources within FIG. 1. For example, mail servers may be used to send and receive electronic messages by employees of an organization. In addition, file and content management servers may be used to provide a location for sharing files and documents with employees of an organization.

Communication servers 110(1)-(N) are often times used as mail servers within an organization. Mail servers may be of the same or different types. Examples of mail servers are MICROSOFT EXCHANGE SERVER® available from Microsoft Corporation and POSTFIX® available from IBM Corporation. In addition, each mail server may be located within different offices, states, or countries. The number of mail servers maintained by an organization varies and may depend upon the size of the organization, the number of different sites or locations where the organization conducts business, and/or the physical capabilities of each mail server.

Communication servers 110(1)-(N), when used as mail servers, typically include a journaling mailbox and user mailboxes. Henceforth, a journaling mailbox and user mailboxes will be referred to as a mailbox. A mailbox is used for temporarily storing and tracking electronic messages sent and received by employees. Mailboxes are typically of finite size and fill quickly. In order to maintain copies of electronic messages beyond the capacity of journaling mailboxes, archive server 120 may be used.

Archive server 120 consists of individual archive storage components 120(1)-(N), which are typically storage components with a large capacity used for storing copies of some or all electronic messages sent or received by employees of an organization. This is performed by collecting copies of some or all electronic messages originating from the mail servers maintained by an organization. These electronic messages may be collected via a network, such as network 130.

Electronic messages from mail servers, once retrieved, can then be stored permanently within archive storage components 120(1)-(N) for archival purposes. As shown, archive storage components 120(1)-(N) include multiple messages 162(1)-(N), shown as messages 162(1)(1)-(1)(N) and 162(N)(1)-(N)(N). Organizations typically employ this type of archival system for backup purposes and to demonstrate routine collection of messages.

In FIG. 1, archive storage components 120(1)-(N) are used to store copies of electronic messages originating from communication servers 110(1)-(N). In the event that additional communication servers existed or were added to system 100, archive storage components 120(1)-(N) could also serve to store copies of electronic messages originating from those communication servers as well. Alternatively, electronic messages originating from additional communication servers may also be stored within additional archive storage components, not shown.

Computing device 140 includes compliance product 150. Compliance product 150 is employed by organizations to receive/fetch, archive, monitor, sample, report, and flag electronic messages received and sent by employees of the organization. In order to do so, compliance product 150 maintains a review set 164, which represents a collection of messages received from archive server 120 and/or communication servers 110.

For example, review set 164 may store all messages received by archive server 120 within a given time period, such as in one day, one week, etc. Messages within review set 164 are a collection of some or all messages received from archive server 120 and/or communication servers 110 and thus may include duplicate copies of the same message. This occurs, for example, when a single sender sends a message to multiple recipients thereby creating multiple copies of the same message and storing all copies within review set 164.

The functionality of compliance product 150 enables organizations to comply with federal regulations regarding the review of electronic messages. For example, compliance product 150 can be used to satisfy the requirements of Financial Industry Regulatory Authority, Inc. (FINRA), which regulates securities firms in the United States.

As an example, FINRA requires that organizations establish products and defensible processes for archiving, sampling, and supervising electronic communications. Also, FINRA requires that organizations implement a compliance department and/or process and have a set percentage of electronic communications sampled and reviewed on a daily basis for potential wrongdoings. In the event that organizations fail to meet such regulations, organizations may be faced with stiff penalties in the form of fines and legal action.

In order to satisfy federal regulations, organizations strive to review a percentage of all electronic messages exchanged by employees of the organization within a given time frame and to do so in good faith. This means that the number of electronic messages reviewed by the organization should be enough to meet the required percentage set by federal regulations and should only include unique copies of electronic messages, i.e., no duplicate copies.

A problem that arises in the messaging and archival process is that duplicate copies are included in the set of electronic messages from which to sample for compliance purposes, e.g., review set 164. This is because whenever an electronic message is composed by one sender and intended for various recipients, several copies of the same electronic message (including the same content but allowing for different address information) are made and stored within archive server 120 or maintained within communication servers 110. Thus, when electronic messages are collected by compliance product 150, there could potentially be duplicate copies of at least some of the electronic messages in review set 164.

Taking a sample of electronic messages from a set of electronic messages that includes duplicate copies is undesirable for a number of reasons. For example, duplicate copies of electronic messages count against the total number of electronic messages from which to sample and doing so would result in failing to meet the required sample percentage mandated by federal regulations. Furthermore, every duplicate electronic message in a sample set could mean that another unique electronic message that contains possible wrongdoing would be missed during the sampling process. This could result in an organization being non-compliant with federal regulations and incur steep fines.

It is thus desirable to remove all (or at least most) of the duplicate copies of electronic messages from a set of electronic messages to be reviewed prior to performing a sampling process. A sampling process can then be performed using nearly all unique copies of electronic messages. Typically, the percentage of electronic messages needed to satisfy sampling requirements is defined by federal regulations.

Once a sample of electronic messages is identified (here, a sample is one in which duplicate messages have been removed or at least reduced in number), these electronic messages may then be reviewed for compliance purposes. This review process may be performed by employees of the organization. The review process is typically performed to ensure that electronic communications sent and received by employees of the organization do not indicate potential illegal or unethical actions being taken by its employees, or performed as otherwise specified by an applicable regulation.

Compliance product 150 is thus used to receive/fetch, archive, monitor, sample, report, and flag electronic messages sent and received by employees of an organization. This functionality is performed using various modules within compliance product 150, as shown in FIG. 2.

Figure 2:
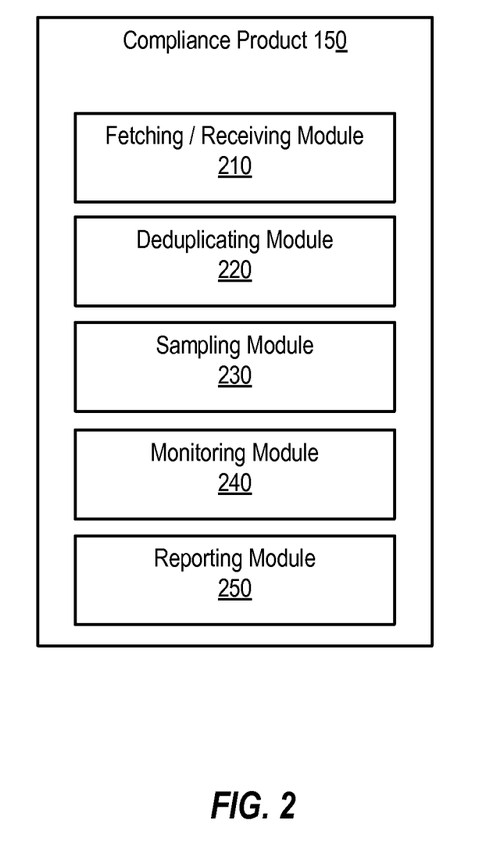
FIG. 2 illustrates a compliance product used in the removal of duplicate electronic messages, according to one embodiment of the present invention.

FIG. 2 illustrates a compliance product 150 used for removing duplicate electronic messages, according to one embodiment of the present invention. Compliance product 150 includes a fetching/receiving module 210, a deduplicating module 220, a sampling module 230, a monitoring module 240, and a reporting module 250.

Fetching/receiving module 210 fetches and/or receives copies of electronic messages that have been sent or received by employees of an organization. Typically, an organization has mail servers from which electronic messages originate. These electronic messages are copied and sent to storage for archiving. As each electronic message is sent over for archiving, a copy of each electronic message is sent to compliance product 150 via fetching/receiving module 210. Alternatively, a copy of the electronic message can also be fetched by fetching/receiving module 210, either from an archive server or from a mail server, in response to a request for new electronic messages by compliance product 150. This process can be repeated over time.

In some cases, only portions of an electronic message may be fetched or received by fetching/receiving module 210. For example, fetching/receiving module 210 may fetch or retrieve only pertinent metadata or content of an electronic message, rather than fetching or receiving all metadata and content of an electronic message.

Once copies of electronic messages are fetched and/or received, duplicate copies of electronic messages are removed by deduplicating module 220. Deduplicating module 220 calculates a signature for each electronic message. A signature for an electronic message is typically based on some or all of the attributes of an electronic message, such as the contents and/or metadata of the electronic message. A signature can be calculated, for example, by applying a hashing algorithm to some or all of the contents of an electronic message. Other techniques, such as applying a checksum algorithm to each message, can also be used to generate message signatures. Alternatively, a signature corresponding to an electronic message can be received by deduplicating module 220 from an archival server or mail server.

In either case, a signature corresponding to an electronic message is identified and used by deduplicating module 220 to determine if an electronic message is a duplicate copy of another electronic message. Electronic messages that are duplicate copies of another electronic message typically have the same signature. Thus, by comparing signatures corresponding to an electronic message, duplicate copies of electronic messages can be identified.

Typically, deduplicating module 220 maintains a signature list that identifies unique electronic messages along with their corresponding signatures. When examining electronic messages, a signature corresponding to an electronic message is identified (either by calculating the signature or by retrieving a signature calculated by another component within the system) and compared against the signatures within the signature list. If the signature list already contains an entry for the same signature as the one calculated for the electronic message under examination, the electronic message is considered a duplicate copy and therefore not included within a set of unique electronic messages, i.e., the review set from which to sample. In the event that the signature list does not contain an entry for the same signature as the one calculated for the electronic message under examination, the electronic message under examination is not considered a duplicate copy. In this case, the electronic message is added to a review set from which to sample and the signature is added to the signature list maintained by deduplicating module 230. This determination is performed for all electronic messages fetched and/or received from an archive server or mail server.

Once duplicate copies of electronic messages have been removed, deduplicating module 220 can store the resulting set of electronic messages as the review set from which to sample. This resulting set of electronic messages can then be used by sampling module 230 to perform the necessary sampling.

Sampling module 230 retrieves a certain percentage of electronic messages from the set of electronic messages maintained by deduplicating module 220. The percentage of electronic messages varies by organization and typically equals the percentage mandated by federal rules and regulations.

Once a certain percentage of electronic messages are identified, this set of electronic messages is designated as a sample set. In addition, any electronic messages that have been flagged as possibly problematic by compliance product 150 may also be added to the sample set.

Detailed review of the contents of electronic messages within the sample set can then be performed to ensure an organization complies with federal rules and regulations using monitoring module 240. Monitoring module 240 has configuration settings to define the criteria used when monitoring electronic messages. These configuration settings may be defined by an organization as desired. For example, an organization using monitoring module 240 can configure the settings to specify a list of senders or recipients which are of interest to an organization and from which electronic messages should be flagged for review.

Using monitoring module 240, copies of electronic messages can be flagged or tagged as potential problems. This might occur when electronic messages are sent to particular senders or recipients or include certain words or phrases. This flagging or tagging process is typically performed by individuals within the organization whose job it is to review electronic messages and who possess special skills.

Reporting module 250 reports information regarding the deduplication and monitoring process performed by compliance product 150. This information might include statistical information about the number of electronic messages reviewed, the number of duplicate electronic messages removed from a set, and the number of electronic messages tagged as problematic. The information reported may also explain the outcome of any reviews performed by individuals within the organization.

Reports generated by reporting module 250 may be stored within compliance product 150. In addition, these reports may also be converted prior to storing, such as into a document in a MICROSOFT WORD® or MICROSOFT EXCEL® format, available from MICROSOFT® Corporation.

Figure 3:
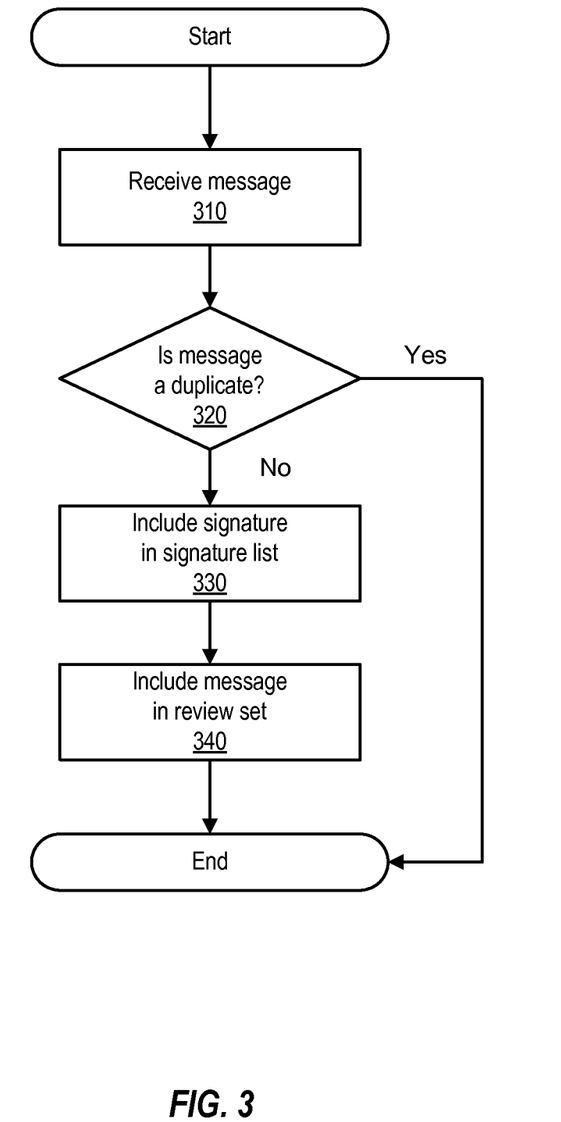
FIG. 3 is a flowchart illustrating an example of a method for removing duplicate electronic messages, according to one embodiment of the present invention.

FIG. 3 is a flowchart illustrating an example method for removing duplicate electronic messages, according to one embodiment of the present invention. The method begins at 310 when an electronic message or relevant portions of an electronic message are received by a compliance product. An electronic message or relevant portions of an electronic message can be received or fetched from a mail server or archive server.

At 320, a determination is made as to whether the electronic message is a duplicate copy of another electronic message. Details as to how this determination is made can be seen in FIG. 4. If the electronic message is determined to be a duplicate copy of another electronic message, the method can either end or be repeated for processing additional electronic messages.

Alternatively, if the electronic message is determined to be unique or not a duplicate of another electronic message, a signature corresponding to the electronic message is included in a signature list, as in 330. In addition, the electronic message is added to a unique set of messages to be reviewed, as in 340. At this point, the method can either end or be repeated for processing additional messages.

Figure 4:
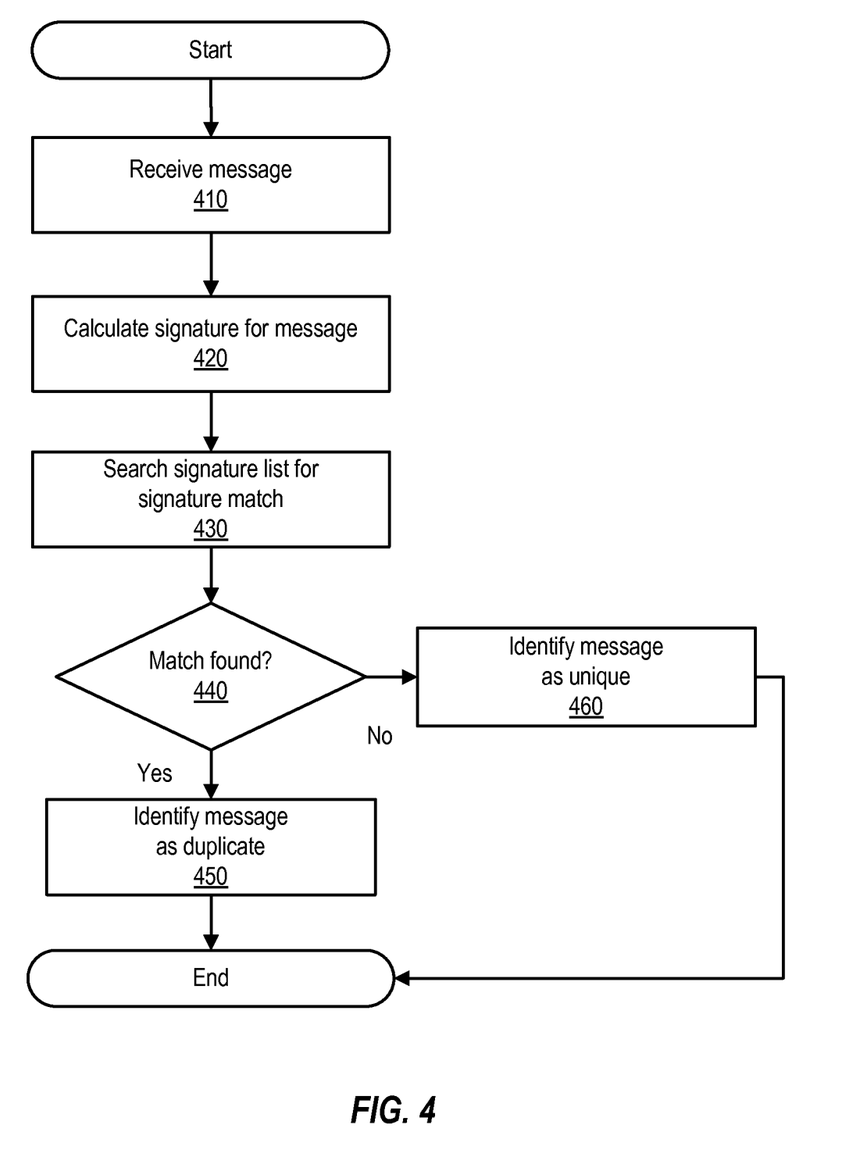
FIG. 4 is a flowchart illustrating an example of a method for identifying duplicate electronic messages, according to one embodiment of the present invention.

FIG. 4 is a flowchart illustrating an example method for determining whether electronic messages are duplicates, according to one embodiment of the present invention. The method begins at 410 where an electronic message or relevant portions of an electronic message are received.

At 420, a signature is calculated for the received message or the received portions of an electronic message. A signature is typically calculated based on the contents and/or metadata of an electronic message and will produce a value that is unique to an electronic message. Thus, duplicate copies of an electronic message will produce equal signatures.

Once a signature for an electronic message is calculated, a search is performed within a signature list as in 430. The signature list is a list of signatures for unique electronic messages within a set of electronic messages to be sampled from. Therefore, the search performed in 430 entails comparing the calculated signature for an electronic message against signatures contained within a signature list. This comparison is performed in order to determine if there is a match between signatures, as seen in 440.

If the signature calculated in 420 is found within a signature list, the electronic message is identified as a duplicate, as in 450. Otherwise, if no match is found within the signature list, the electronic message is identified as unique, as in 460. At this point, the method ends or can be repeated for processing additional electronic messages.

Figure 5:
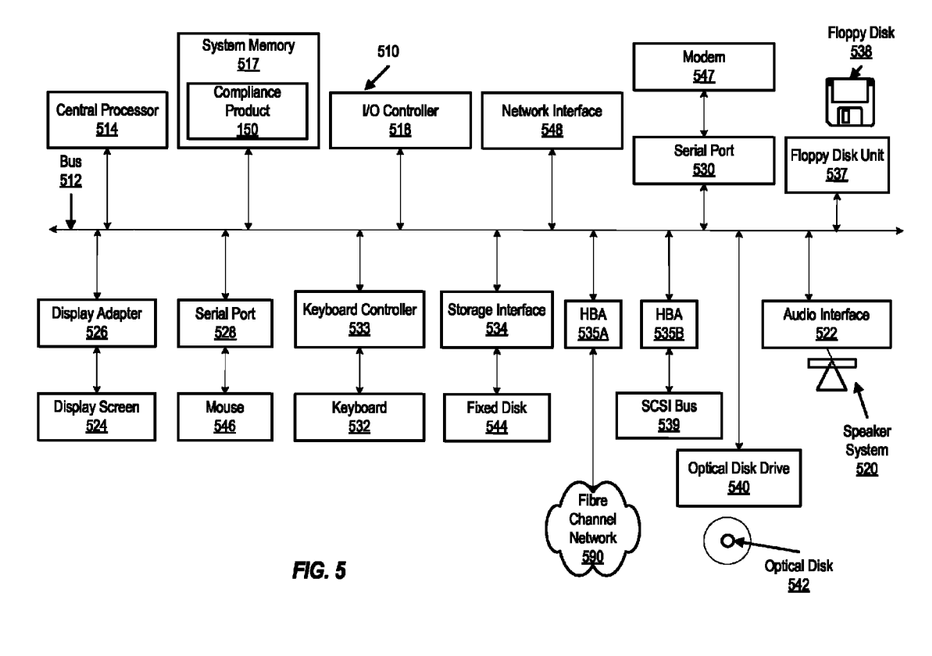
FIG. 5 is a block diagram of a computing system, according to one embodiment of the present invention.

FIG. 5 is a block diagram of a computing system 510 suitable for implementing the deduplication of messages as described above. Computer system 510 includes a bus 512 which interconnects major subsystems of computer system 510, such as a central processor 514, a system memory 517 (typically RAM, but which may also include ROM, flash RAM, or the like, and which may also include software implementing a compliance product 150 like that shown in FIG. 1), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk unit 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer-readable medium, such as a hard disk drive (e.g., fixed disk 544), an optical drive (e.g., optical disk drive 540), a floppy disk unit 537, or other storage medium. Additionally, applications can be in the form of electronic signals modulated in accordance with the application and data communication technology when accessed via modem 547 or network interface 548.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 5 need not be present to practice the present invention. The devices and subsystems can be interconnected in different ways from that shown in FIG. 5. The operation of a computer system is readily known in the art and is not discussed in detail in this application. Code to implement the present invention can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
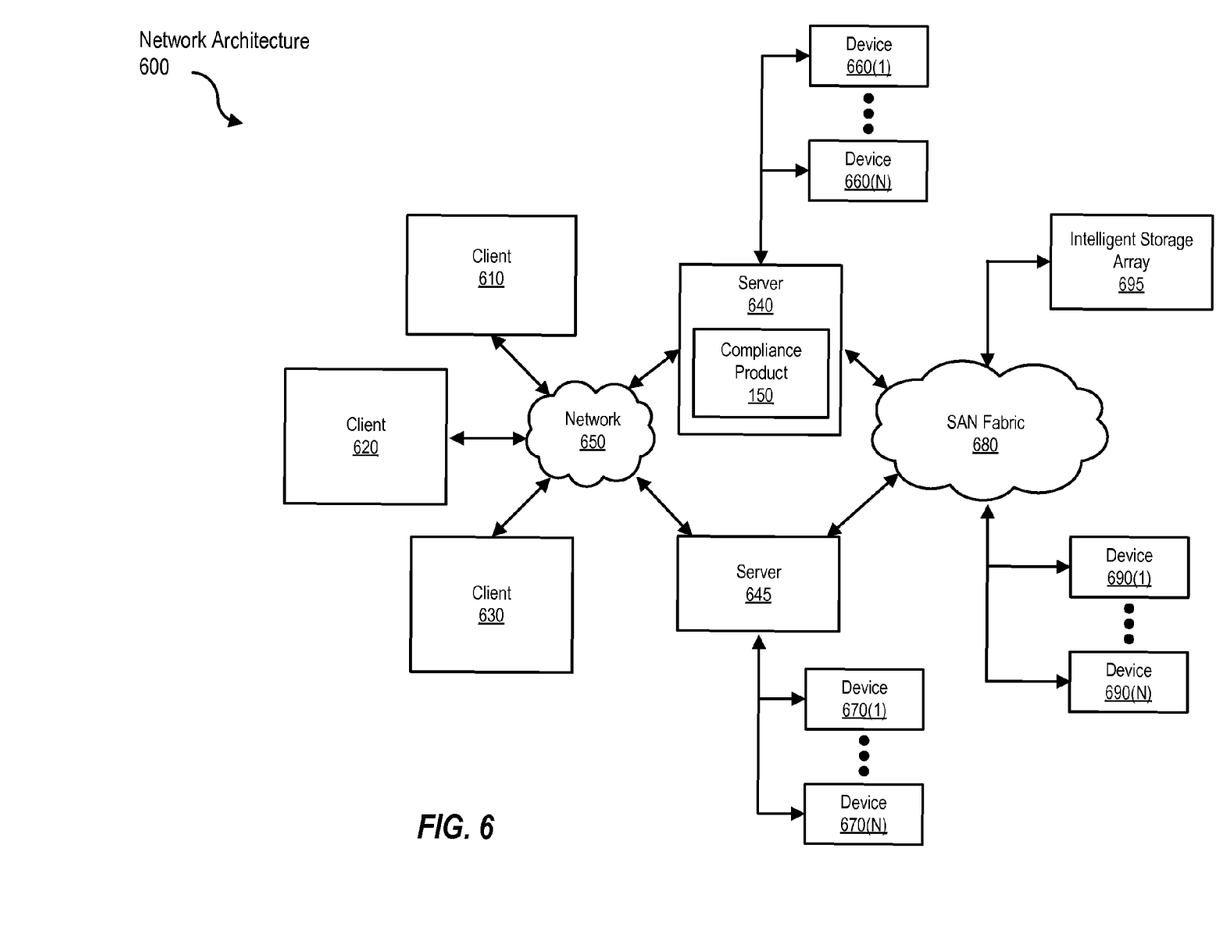
FIG. 6 is a block diagram of a network system, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include a compliance product 150 as shown in FIGS. 1 and 5.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of the computing devices in FIGS. 1, 2, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a compliance product 150 in FIG. 1 may transform messages received into signatures and then use those signatures to transform a set of messages from a set that includes duplicate messages into a set with a reduced number of (or even no) duplicate messages.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  receiving a first message, wherein
    the first message is received by a computing device, and
    the computing device implements a compliance product;
  storing the first message at the computing device, wherein
    the first message is stored as part of a review set, and
    the review set includes duplicate copies of messages;
  determining if the first message is a duplicate copy of any other message in the review set;
  if the first message is not a duplicate copy, adding the first message to a set of deduplicated messages, wherein
    the determining and the adding are performed by the compliance product, and
    the set of deduplicated messages excludes the duplicate copies of messages from the review set;
  if the first message is a duplicate copy, excluding the first message from the set of deduplicated messages;
  sampling the set of deduplicated messages, wherein
    the sampling is performed by the compliance product,
    the sampling results in a sample set comprising
      a first subset of messages that are each associated with a unique hash value, and
      a second subset of messages that have been flagged as potentially problematic, and
    the sample set represents a percentage of all messages in the set of deduplicated messages within a given time frame, wherein
      the percentage is determined by a set of federal regulations regarding review of electronic messages, and
      the federal regulations are applicable to the all messages in the set of deduplicated messages; and
  determining whether each message in the sample set complies with the set of federal regulations.

2. The method of claim 1, further comprising:
  if the first message is not a duplicate copy, adding a hash value for the first message to a list, wherein
    the list comprises hash values for messages previously included in the set of deduplicated messages.

3. The method of claim 1, wherein the determining if the first message is a duplicate copy further comprises:
  calculating a hash value for the first message, wherein
    the hash value is calculated based on contents and metadata of the first message;
  comparing the hash value of the first message with other hash values for other messages included in a hash list;

if a match is found for the hash value of the first message, determining that the first message is a duplicate copy; and
if no match is found for the hash value of the first message, determining that the first message is not a duplicate copy.

4. The method of claim 1, further comprising:
collecting the sample set; and
if the each message in the sample set does not comply with the set of federal regulations, flagging the each message as potentially non-compliant.

5. The method of claim 1, further comprising:
receiving the first message from an archive server.

6. The method of claim 1, further comprising
receiving a second message, wherein
the first message is a copy of a message originating from a first communication server, and
the second message is a copy of a message originating from a second communication server; and
adding the second message to the review set.

7. The method of claim 1, further comprising:
adding a second message to the sample set, prior to the determining whether each message in the sample set complies with the set of federal regulations, wherein
the second message was previously identified as problematic by the compliance product.

8. The method of claim 1, further comprising:
defining criteria for monitoring messages at the compliance product.

9. The method of claim 1, wherein
the given time frame is defined on a daily basis.

10. A non-transitory computer readable storage medium comprising program instructions executable to:
receive a first message;
store the first message, wherein
the first message is stored as part of a review set, and
the review set includes duplicate copies of messages;
determine if the first message is a duplicate copy of any other message in the review set;
add the first message to a set of deduplicated messages, if the first message is not a duplicate copy, wherein
the set of deduplicated messages excludes the duplicate copies of messages from the review set;
exclude the first message from the set of deduplicated messages, if the first message is a duplicate copy;
sample the set of deduplicated messages, wherein
the receiving, the storing, the determining if the first message is a duplicate copy, the adding, the excluding, and the sampling are performed by a computing device,
the computing device implements a compliance product,
the sampling results in a sample set comprising
a first subset of messages that are each associated with a unique hash value, and
a second subset of messages that have been flagged as potentially problematic, and
the sample set represents a percentage of all messages in the set of deduplicated messages within a given time frame, wherein
the percentage is determined by a set of federal regulations regarding review of electronic messages, and
the federal regulations are applicable to the all messages in the set of deduplicated messages; and
determine whether each message in the sample set complies with the set of federal regulations.

11. The non-transitory computer readable storage medium of claim 10, wherein the program instructions are further executable to:
add a hash value for the first message to a list, if the first message is not a duplicate copy, wherein
the list comprises hash values for messages previously included in the set of deduplicated messages.

12. The non-transitory computer readable storage medium of claim 10, wherein the program instructions are further executable to:
calculate a hash value for the first message, wherein
the hash value is calculated based on contents and metadata of the first message;
compare the hash value of the first message with other hash values for other messages included in a hash list;
determine that the first message is a duplicate copy, if a match is found for the hash value of the first message; and
determine that the first message is not a duplicate copy, if no match is found for the hash value of the first message.

13. The non-transitory computer readable storage medium of claim 10, wherein the program instructions are further executable to:
collect the sample set; and
flag the each message in the sample set as potentially non-compliant, if the each message does not comply with the set of federal regulations.

14. The non-transitory computer readable storage medium of claim 10, wherein the program instructions are further executable to:
receive the first message from an archive server.

15. The non-transitory computer readable storage medium of claim 10, wherein the program instructions are further executable to:
receive a second message, wherein
the first message is a copy of a message originating from a first communication server, and
the second message is a copy of a message originating from a second communication server; and
add the second message to the review set.

16. A system comprising:
one or more processors; and
memory coupled to the one or more processors, wherein the memory stores program instructions executable by the one or more processors to:
receive a first message,
store the first message, wherein
the first message is stored as part of a review set, and
the review set includes duplicate copies of messages,
determine if the first message is a duplicate copy of any other message in the review set,
add the first message to a set of deduplicated messages, if the first message is not a duplicate copy, wherein
the set of deduplicated messages excludes the duplicate copies of messages from the review set,
exclude the first message from the set of deduplicated messages, if the first message is a duplicate copy,
sample the set of deduplicated messages, wherein
the receiving, the storing, the determining if the first message is a duplicate copy, the adding, the excluding, and the sampling are performed by a computing device,
the computing device implements a compliance product,
the sampling results in a sample set comprising
a first subset of messages that are each associated with a unique hash value, and a second subset of messages that have been flagged as potentially problematic, and the sample set represents a percentage of all messages in the set of deduplicated messages within a given time frame, wherein the percentage is determined by a set of federal regulations regarding review of electronic messages, and the federal regulations are applicable to the all messages in the set of deduplicated messages, and determine whether each message in the sample set complies with the set of federal regulations.

17. The system of claim 16, wherein the program instructions are further executable to:

add a hash value for the first message to a list, if the first message is not a duplicate copy, wherein the list comprises hash values for messages previously included in the set of deduplicated messages.

18. The system of claim 16, wherein the program instructions are further executable to:

calculate a hash value for the first message, wherein the hash value is calculated based on contents and metadata of the first message, compare the hash value of the first message with other hash values for other messages included in a hash list, determine that the first message is a duplicate copy, if a match is found for the hash value of the first message, and determine that the first message is not a duplicate copy, if no match is found for the hash value of the first message.

19. The computer readable storage medium of claim 18, wherein the program instructions are further executable to:

collect the sample set, and flag the each message in the sample set as potentially non-compliant, if the each message does not comply with the set of federal regulations.

20. The computer readable storage medium of claim 18, wherein the program instructions are further executable to:

receive the first message from an archive server.

21. The computer readable storage medium of claim 16, wherein the program instructions are further executable to:

receive a second message, wherein the first message is a copy of a message originating from a first communication server, and the second message is a copy of a message originating from a second communication server, and add the second message to the review set.

* * * * *

UNITED STATES PATENT AND TRADEMARK OFFICE
CERTIFICATE OF CORRECTION

PATENT NO. : 9,164,687 B1
APPLICATION NO. : 13/006909
DATED : October 20, 2015
INVENTOR(S) : Bhatt et al.

Page 1 of 1

It is certified that error appears in the above-identified patent and that said Letters Patent is hereby corrected as shown below:

In the Claims

Column 10
Line 52, in Claim 1, replace: "the federal" by -- the set of federal --

Column 11
Line 64, in Claim 10, replace: "the federal" by -- the set of federal --

Column 13
Line 9, in Claim 16, replace: "the federal" by -- the set of federal --

Column 14
Line 6, in Claim 19, replace: "computer readable storage medium" by -- system --
Line 13, in Claim 20, replace: "computer readable storage medium" by -- system --
Line 16, in Claim 21, replace: "computer readable storage medium" by -- system --

Signed and Sealed this
Twenty-first Day of June, 2016

Michelle K. Lee
*Director of the United States Patent and Trademark Office*